(12) United States Patent
Hosono

(10) Patent No.: US 7,995,152 B2
(45) Date of Patent: Aug. 9, 2011

(54) TV INCLUDING A DATA STORAGE SECTION

(75) Inventor: Makoto Hosono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1194 days.

(21) Appl. No.: 11/712,951

(22) Filed: Mar. 2, 2007

(65) Prior Publication Data

US 2007/0216818 A1 Sep. 20, 2007

(30) Foreign Application Priority Data

Mar. 17, 2006 (JP) .................... 2006-074730

(51) Int. Cl.
*H04N 5/63* (2006.01)
*H04N 5/44* (2006.01)
(52) U.S. Cl. ........................ 348/730; 348/725
(58) Field of Classification Search .................. 348/730, 348/725, 553, 714, 718–720, 722, 705, 706, 348/552, 177, 178, 180, 184, 189; 713/300, 713/310, 320, 340; *H04N 5/44, 7/00, 17/00, H04N 5/268, 9/64, 5/222, 5/63*
See application file for complete search history.

(56) References Cited

U.S. PATENT DOCUMENTS 5,646,699 A * 7/1997 Oh et al. ................. 348/553
2008/0030624 A1* 2/2008 Chang ..................... 348/730

FOREIGN PATENT DOCUMENTS

| JP | A-2003-23576 | 1/2003 |
| JP | A-2003-219307 | 7/2003 |
| JP | A 2005-351996 | 12/2005 |

* cited by examiner

*Primary Examiner* — Sherrie Hsia
(74) *Attorney, Agent, or Firm* — Oliff & Berridge, PLC

(57) ABSTRACT

A TV including: an interface section connected to an external device including a power supply section and a data storage section; and a main body storage section which stores TV data, wherein the main body storage section is set to a readable state by supplying power from the power supply section through the interface section; and wherein the interface section outputs the TV data to the data storage section of the external device when the main body storage section is in the readable state.

7 Claims, 3 Drawing Sheets

TV INCLUDING A DATA STORAGE SECTION

Japanese Patent Application No. 2006-74730, filed on Mar. 17, 2006, is hereby incorporated by reference in its entirety.

BACKGROUND OF THE INVENTION

The present invention relates to a TV and a TV data transfer control method.

In recent years, the screen size of TVs has been increased. It is difficult for the user to send a large-screen TV for repair. Therefore, it is common practice for a repairman to visit the user's home and repair the TV.

TV data such as channel setting data is stored in a TV. When replacing basic parts of a TV due to a breakdown or the like, it is preferable to restore the TV data to the original state. However, since the repairman restores the TV data by manual operation, it is difficult to restore the TV data to the original state.

In this case, a method may be considered in which the setting data is stored in an external device and written into the TV after completion of repairs, much like the case of changing the model of a portable telephone.

A method may also be considered in which the setting data stored in an external memory is rewritten into the TV, as disclosed in JP-A-2005-351996.

However, since a TV cannot be easily carried, differing from a portable telephone, the method used when changing the model of a portable telephone cannot be directly applied.

When using the above method, power must be supplied to the data transfer target instrument. However, since power is not generally supplied to the TV during repair, the above method cannot be directly applied.

SUMMARY

According to a first aspect of the invention, there is provided a TV comprising:

an interface section connected to an external device including a power supply section and a data storage section;

a main body storage section which stores TV data; and a main body power supply which can supply power to at least the main body storage section, wherein the main body storage section in an unreadable state in which power is not supplied from the main body power supply is set to a readable state by supplying power from the power supply section through the interface section; and wherein the interface section outputs the TV data to the data storage section of the external device when the main body storage section is in the readable state.

According to a second aspect of the invention, there is provided a TV comprising:

an interface section connected to an external device including a power supply section and a data storage section storing TV data;

a main body storage section; and a main body power supply which can supply power to at least the main body storage section, wherein the main body storage section in an unwritable state in which power is not supplied from the main body power supply is set to a writable state by supplying power from the power supply section through the interface section; and wherein the interface section writes the TV data into the main body storage section when the main body storage section is in the writable state.

According to a third aspect of the invention, there is provided a TV data transfer control method, wherein, when an external device including a power supply section and a data storage section is connected to a TV having a main body storage section, a computer in the external device or a computer in the TV sets the main body storage section which is in an unreadable state to a readable state by supplying power from the power supply section, and writes data stored in the main body storage section into the data storage section.

According to a fourth aspect of the invention, there is provided a TV data transfer control method, wherein, when an external device including a power supply section and a data storage section is connected to a TV having a main body storage section, a computer in the external device or a computer in the TV sets the main body storage section which is in an unwritable state to a writable state by supplying power from the power supply section, and writes data stored in the main body storage section into the data storage section.

DETAILED DESCRIPTION OF THE EMBODIMENT

Figure 1:
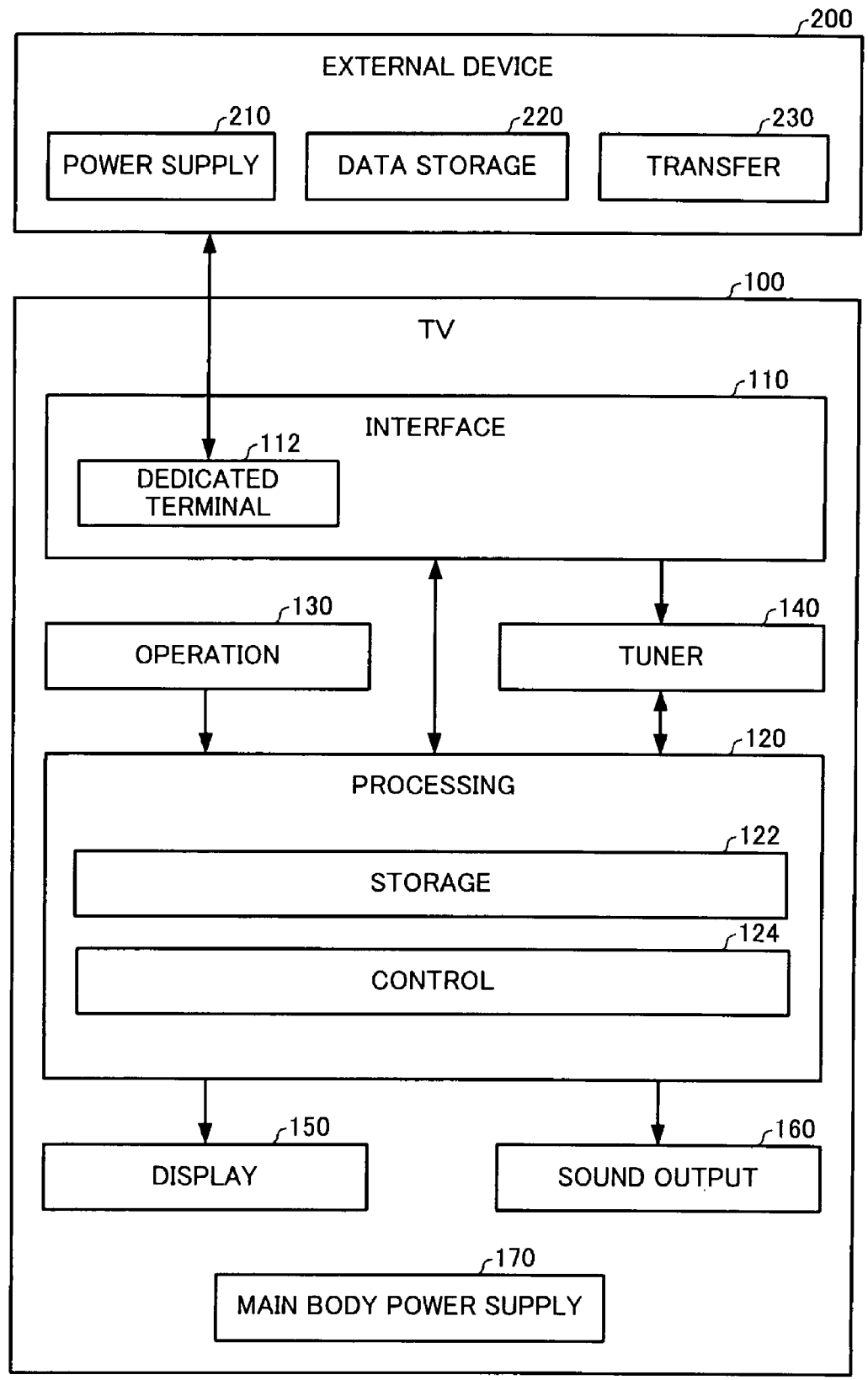
FIG. 1 is a functional block diagram of a TV according to one embodiment of the invention.

The invention may provide a TV and a TV data transfer control method in which internal data can be read or written even when power is not supplied to the TV.

According to one embodiment of the invention, there is provided a TV comprising:

an interface section connected to an external device including a power supply section and a data storage section;

a main body storage section which stores TV data; and a main body power supply which can supply power to at least the main body storage section, wherein the main body storage section in an unreadable state in which power is not supplied from the main body power supply is set to a readable state by supplying power from the power supply section through the interface section; and wherein the interface section outputs the TV data to the data storage section of the external device when the main body storage section is in the readable state.

According to one embodiment of the invention, there is provided a TV data transfer control method, wherein, when an external device including a power supply section and a data storage section is connected to a TV having a main body storage section, a computer in the external device or a computer in the TV sets the main body storage section which is in an unreadable state to a readable state by supplying power from the power supply section, and writes data stored in the main body storage section into the data storage section.

According to the above embodiments, since power can be supplied to the main body storage section of the TV by using the external device, the data can be read from the TV into the external device even when power is not supplied to the TV.

The main body storage section in an unwritable state in which power is not supplied from the main body power supply may be set to a writable state by supplying power from the power supply section through the interface section; and the interface section may rewrite the TV data stored in the data storage section into the main body storage section when the main body storage section is in the writable state.

According to this configuration, since power can be supplied to the main body storage section of the TV by using the external device, even when power is not supplied to the TV, in which state data cannot be written into and read from the main body storage section, the data can be read from the TV into the external device, and the data stored in the external device can be rewritten into the main body storage section of the TV after completion of repair.

According to one embodiment of the invention, there is provided a TV comprising:

an interface section connected to an external device including a power supply section and a data storage section storing TV data;

a main body storage section; and a main body power supply which can supply power to at least the main body storage section, wherein the main body storage section in an unwritable state in which power is not supplied from the main body power supply is set to a writable state by supplying power from the power supply section through the interface section; and wherein the interface section writes the TV data into the main body storage section when the main body storage section is in the writable state.

According to one embodiment of the invention, there is provided a TV data transfer control method, wherein, when an external device including a power supply section and a data storage section is connected to a TV having a main body storage section, a computer in the external device or a computer in the TV sets the main body storage section which is in an unwritable state to a writable state by supplying power from the power supply section, and writes data stored in the main body storage section into the data storage section.

According to the above embodiments, since power can be supplied to the main body storage section of the TV by using the external device, the data stored in the external device can be written into the main body storage section of the TV even when power is not supplied to the TV.

The interface section may include:

a terminal connectable to the external device; and a switch section which switches a state of the TV between a normal state for inputting and outputting information through the terminal via a normal path and a maintenance state for inputting and outputting the TV data through the terminal via a path differing from the normal path.

According to this configuration, since the terminal used during the normal operation can also be used during maintenance (e.g. breakdown), it is unnecessary to provide another terminal for maintenance, whereby the manufacturing cost of the TV can be reduced.

The TV data may include at least one of user setting data set by a user, system setting data set by a system of the TV, and downloaded data.

According to this configuration, the user setting data or the like can be read, or the backed-up user setting data or the like can be rewritten.

The invention is described below with reference to the drawings taking the case of applying the invention to a TV as an example. Note that the embodiments described below do not in any way limit the scope of the invention laid out in the claims herein. In addition, not all of the elements of the embodiments described below should be taken as essential requirements of the invention.

FIG. 1 is a functional block diagram of a TV 100 according to one embodiment of the invention.

The TV 100 is a large-screen TV such as a projection TV, a plasma TV, or a liquid crystal TV, and is formed so that the TV 100 can be connected with an external device 200. The external device 200 includes a power supply section 210, a data storage section 220, and a transfer section 230. In more detail, the external device 200 is a portable personal computer (PC), a portable dedicated device, or the like.

The TV 100 includes an interface section 110 which can be connected with the external device 200, a processing section 120, an operation section 130, a tuner section 140, a display section 150, and a sound output section 160, and a main body power supply 170.

The interface section 110 includes a dedicated terminal 112 which is a maintenance dedicated terminal.

The processing section 120 includes a storage section 122 which stores TV data and the like, and a control section 124 which controls the display section 150 and the like based on the TV data and the like. The storage section 122 is set in a writable/readable state when a voltage (power) is supplied from the main body power supply 170, and is set in an unwritable/unreadable state when a voltage is not supplied due to power-off or the like.

As examples of the TV data, user setting data set by the user, system setting data set by the system of the TV, downloaded data, and the like can be given. As examples of the user setting data, data indicating a display setting such as dynamic or theater, data indicating the user's place of residence, data indicating the region of the user, data set in units of input sources such as a component and video (e.g. image size data and subtitle position setting data), data set in units of channels (e.g. data indicating the combination of the reception channel and the channel button and record programming data), data set in units of image signals (e.g. hue and brightness), and the like can be given. As examples of the system setting data, data indicating the cumulative operation time of a light source lamp, error history data, and the like can be given. As examples of the downloaded data, data indicating the point the user scores as a result of viewing digital broadcasting, firmware update data, and the like can be given.

The function of each section of the TV 100 may be implemented using hardware similar to that of a general TV. For example, an RS-232C terminal, a USB terminal, or the like may be used as the dedicated terminal 112, a nonvolatile memory or the like may be used as the storage section 122, and a CPU or the like may be used as the control section 124.

The external device 200 may be implemented using hardware similar to that of a general PC. For example, a power supply or the like may be used as the power supply section 210, a flash memory or the like may be used as the data storage section 220, and a CPU or the like may be used as the transfer section 230. When configuring the external device 200 as a dedicated device, an adaptor which can be connected with the dedicated terminal 112 may be provided to the external device 200.

The flow of a repair process using each section is described below.

Figure 2:
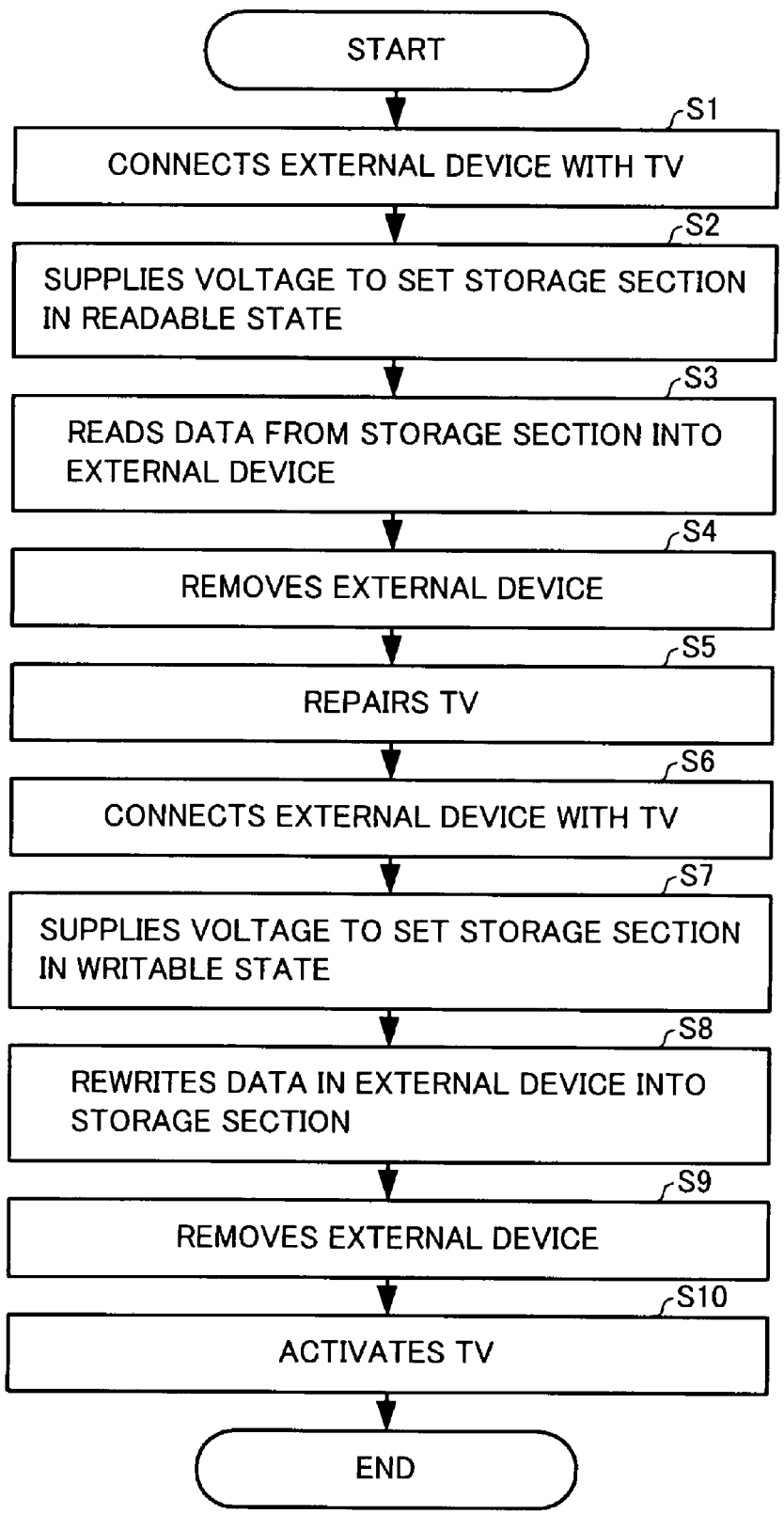
FIG. 2 is a flowchart showing the flow of a repair process according to one embodiment of the invention.

FIG. 2 is a flowchart showing the flow of the repair process according to this embodiment.

A repairman repairs the TV 100 installed in the user's home using the external device 200.

The repairman connects the external device 200 with the dedicated terminal 112 of the TV 100 without connecting the power cord of the TV 100 to the power supply for safety (step S1). In this state, the storage section 122 is set in an unwritable/unreadable state since power is not supplied to the TV 100. Accordingly, the external device 200 cannot directly read the data stored in the storage section 122.

The power supply section 210 supplies a voltage (power) to the storage section 122 through the dedicated terminal 112 to set the storage section 122 in a readable state (step S2). The transfer section 230 reads the data (TV data) stored in the storage section 122 into the data storage section 220 (step S3). When the external device 200 is a dedicated device, the repairman may carry out the steps S2 and S3 by pressing a data read button provided to the dedicated device. When the external device 200 is a portable PC, the repairman may carry out the steps S2 and S3 by selecting "read data" in an image menu by means of a keyboard operation or the like.

After reading the data, the repairman removes the external device 200 from the TV 100 (step S4).

The repairman then repairs the TV 100 (step S5). In this case, the repairman may replace the substrate (processing section 120) including the storage section 122 with a new substrate.

After repairing the TV 100, the repairman again connects the external device 200 with the TV 100 (step S6).

The repairman directs the external device 200 to rewrite the data by means of a button operation or the like. The power supply section 210 supplies a voltage (power) to the storage section 122 in accordance with the instruction to set the storage section 122 in a writable state (step S7). The transfer section 230 rewrites the data stored in the data storage section 220 into the storage section 122 in accordance with the instruction (step S8).

After rewriting the data, the repairman removes the external device 200 from the TV 100 (step S9).

The repairman supplies power to the main body power supply 170 by inserting the power cord of the TV 100 into the power supply to activate the TV 100 (step S10), and checks the operation of the TV 100.

According to this embodiment, since power can be supplied to the storage section 122 of the TV 100 using the external device 200, the data can be read from the storage section 122 into the external device 200 or the data stored in the external device 200 can be rewritten into the storage section 122 after completion of repair, even when power is not supplied to the TV 100 during a breakdown or the like.

In particular, the repairman can accurately and promptly restore the data (e.g. user setting data) stored in the storage section 122 without erroneously changing the user setting or the like.

The invention is not limited to the above-described embodiments. Various modifications and variations may be made.

In the above embodiment, the dedicated terminal 112 is used for the TV 100. Note that a general-purpose terminal may also be used.

Figure 3:
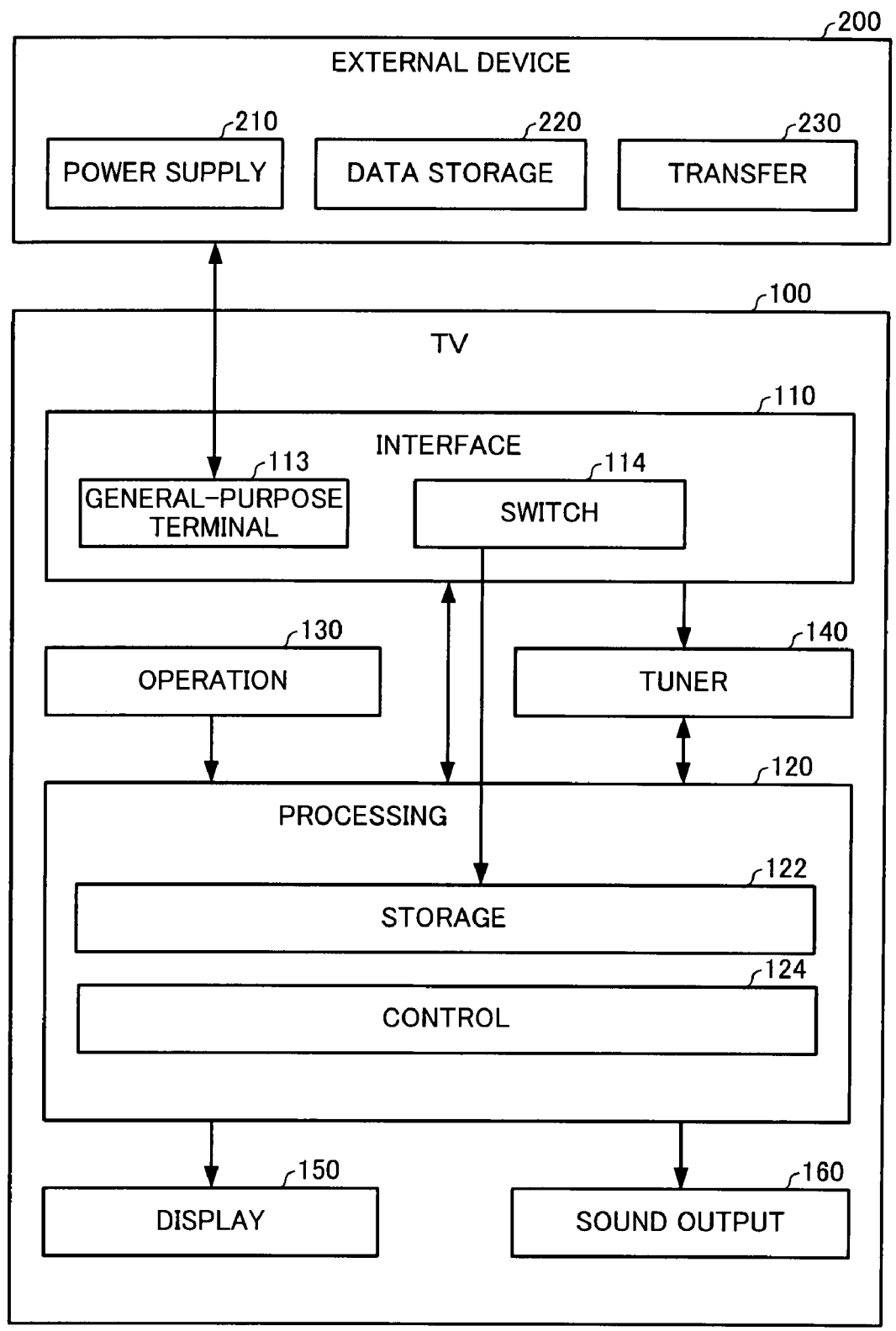
FIG. 3 is a functional block diagram of a TV according to one embodiment of the invention when using a general-purpose terminal.

FIG. 3 is a functional block diagram of the TV 100 according to this embodiment when using a general-purpose terminal.

In the interface section 110 shown in FIG. 3, a general-purpose terminal 113 is provided instead of the dedicated terminal 112, and a switch section 114 is additionally provided. As examples of the general-purpose terminal 113, a USB terminal, an RS-232C terminal, and the like can be given. The general-purpose terminal 113 is used to input and output image data or the like during normal operation, and is used to input and output the above-mentioned user setting data or the like during maintenance.

The switch section 114 switches the voltage input path to the storage section 122 from a normal path to a voltage supply path from the main body power supply 170 from the external device 200 in accordance with the instruction from the external device 200. The power supply section 210 supplies a voltage to a VCC terminal of the storage section 122 through the voltage supply path to set the storage section 122 in an operable state.

According to this modification, since the general-purpose terminal 113 used during normal operation can also be used during maintenance (e.g. breakdown), it is unnecessary to provide another terminal for maintenance, whereby the manufacturing cost of the TV 100 can be reduced. When the switch section 114 has switched the state of the TV 100 from a normal state (state using the voltage supply path from the main body power supply 170) to a maintenance state (state using the voltage supply path from the power supply section 210), the switch section 114 switches the state of the TV 100 from the maintenance state to the normal state after completion of maintenance.

The invention may also be applied to the case of replacing the TV 100 with another TV or the like in addition to the case of repairing the TV 100. For example, the user may connect the external device 200 with the TV 100, store the user setting data and the like in the external device 200, connect the external device 200 with a new TV 100, and write the user setting data and the like into the storage section 122 of the new TV 100.

This allows the user to use the setting of the original TV 100 in a new TV 100 when purchasing a new TV 100, for example. The data transfer operation may be performed by the user or the repairman.

The data may be transferred between the TV 100 and the external device 200 by the transfer section 230 of the external device 200 or the control section 124 of the TV 100. The TV data need not include all of the user setting data, the system setting data, and the downloaded data. It suffices that the TV data include at least one of the user setting data, the system setting data, and the downloaded data.

The functions of the TV 100 may be distributed in a plurality of devices. For example, the interface section 110, the tuner section 140, and the processing section 120 may be provided in a digital broadcasting tuner, and the TV may display an image received through the tuner.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A TV comprising:
   an interface section connected to an external device including a power supply section and a data storage section;
   a main body storage section which stores TV data; and
   a main body power supply which can supply power to at least the main body storage section,
   wherein the main body storage section in an unreadable state in which power is not supplied from the main body power supply is set to a readable state by supplying power from the power supply section through the interface section; and
   wherein the interface section outputs the TV data to the data storage section of the external device when the main body storage section is in the readable state.

2. The TV as defined in claim 1,
wherein the main body storage section in an unwritable state in which power is not supplied from the main body power supply is set to a writable state by supplying power from the power supply section through the interface section; and
wherein the interface section rewrites the TV data stored in the data storage section into the main body storage section when the main body storage section is in the writable state.

3. The TV as defined in claim 1,
wherein the interface section includes:
a terminal connectable to the external device; and
a switch section which switches a state of the TV between a normal state for inputting and outputting information through the terminal via a normal path and a maintenance state for inputting and outputting the TV data through the terminal via a path differing from the normal path.

4. The TV as defined in claim 3,
wherein the TV data includes at least one of user setting data set by a user, system setting data set by a system of the TV, and downloaded data.

5. A TV comprising:
an interface section connected to an external device including a power supply section and a data storage section storing TV data;
a main body storage section; and
a main body power supply which can supply power to at least the main body storage section,
wherein the main body storage section in an unwritable state in which power is not supplied from the main body power supply is set to a writable state by supplying power from the power supply section through the interface section; and
wherein the interface section writes the TV data into the main body storage section when the main body storage section is in the writable state.

6. The TV as defined in claim 5,
wherein the interface section includes:
a terminal connectable to the external device; and
a switch section which switches a state of the TV between a normal state for inputting and outputting information through the terminal via a normal path and a maintenance state for inputting and outputting the TV data through the terminal via a path differing from the normal path.

7. The TV as defined in claim 6,
wherein the TV data includes at least one of user setting data set by a user, system setting data set by a system of the TV, and downloaded data.

\* \* \* \* \*